Dec. 16, 1969  J. L. GROSH  3,483,896
COMPOSITE REINFORCED PLASTIC PIPE
Filed May 2, 1966  2 Sheets-Sheet 1

INVENTOR.
JAMES L. GROSH
BY
ATTORNEY

Dec. 16, 1969 J. L. GROSH 3,483,896
COMPOSITE REINFORCED PLASTIC PIPE
Filed May 2, 1966 2 Sheets-Sheet 2

INVENTOR.
JAMES L. GROSH
BY
ATTORNEY

United States Patent Office

3,483,896
Patented Dec. 16, 1969

3,483,896
COMPOSITE REINFORCED PLASTIC PIPE
James L. Grosh, Los Altos, Calif., assignor to United Aircraft Corporation, East Hartford, Conn., a corporation of Delaware
Filed May 2, 1966, Ser. No. 546,676
Int. Cl. F16l 9/14
U.S. Cl. 138—141                                   29 Claims

ABSTRACT OF THE DISCLOSURE

Reinforced plastic pipe capable of withstanding internal and external pressure loads and bending loads having a unitary wall structure comprising a cured plastic matrix containing a layer of longitudinally disposed high tensile strength filaments and a plurality of layers of continuous annularly disposed high tensile strength filaments, successive layers of annularly disposed filaments being separated by layers of particulate material, preferably from 2 to 50 times thicker than the filamentary layer.

BACKGROUND OF THE INVENTION

Figure 1:
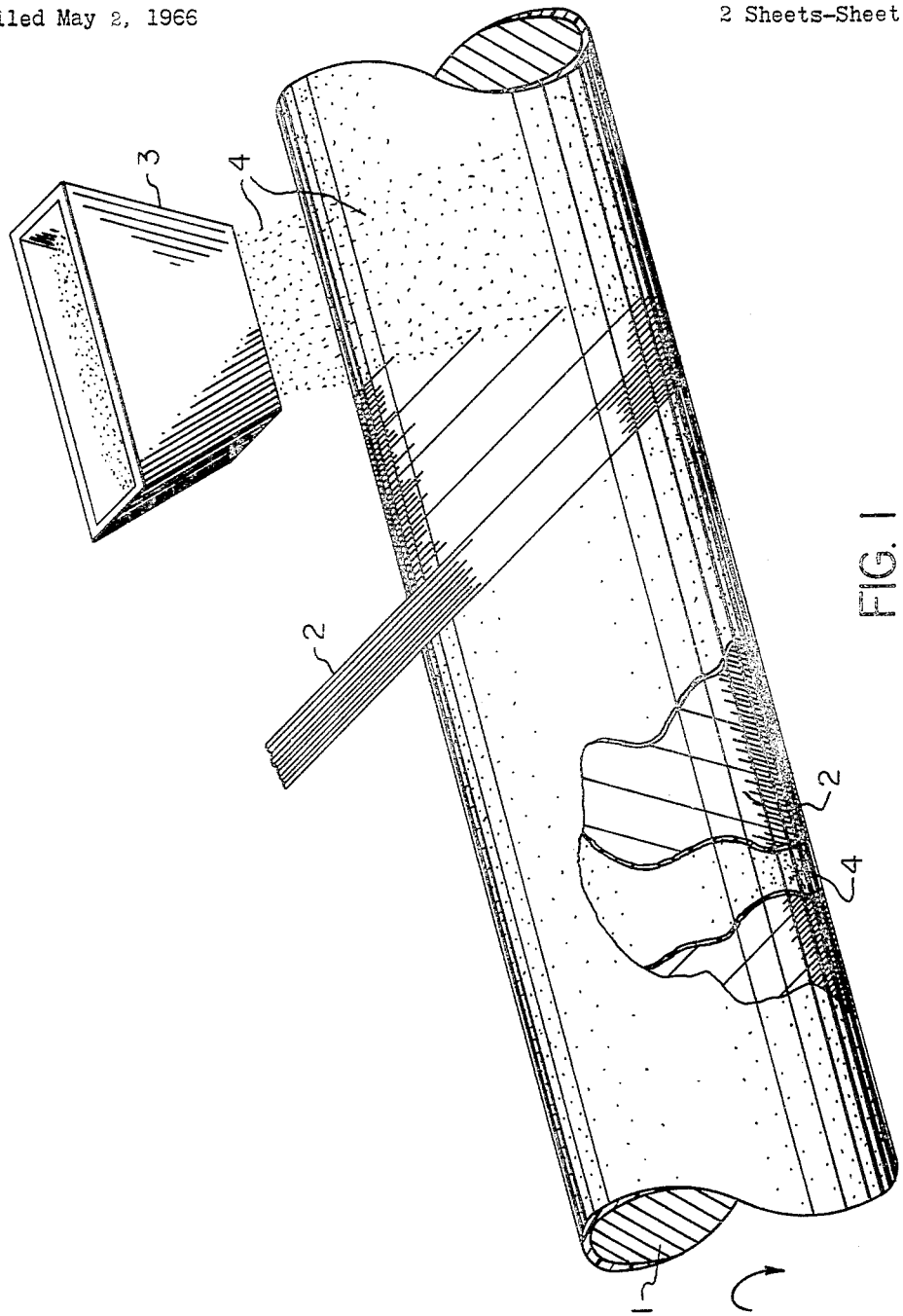

This invention relates to composite reinforced plastic pipes and more particularly to a composite reinforced plastic pipe capable of withstanding both internal and external pressure loads and methods for the fabrication of such pipe.

Reinforced plastic pipes are commonly formed by generating a cylinder from suitable filamentary material by continuously winding the filaments on a removable mandrel, the filaments being impregnated with a curable resinous material either before application to the mandrel or upon application to the mandrel, followed by curing of the structure and removal of the mandrel. By appropriate selection of the filamentary material and the binder, typically glass filaments and an epoxy or polyester resin, strong, corrosion resistant structures can be fabricated.

Due to the high strength of the fiber glass filaments, such a structure is capable of withstanding substantial internal pressure loads. In most applications for large diameter pipes, such as in underground lines, however, the wall thickness is dictated by the external pressure and the nonuniform "D" loads (see ASTM C-76-63T) produced by the ground loading rather than the internal pressure thus requiring structures having walls substantially thicker than would be necessary to withstand internal pressures normally encountered. Since the cost of the raw materials needed for a reinforced plastic pipe capable of withstanding a given external pressure load is substantially greater than the cost of competing materials such as reinforced concrete or steel, the latter materials are generally used in large diameter pipe applications even though the reinforced plastic pipe has generally superior physical and chemical properties.

In order to overcome this difficulty, it has been proposed to form large diameter reinforced plastic pipe in the form of sandwich structures. Such a structure consists of a thin layer of glass filaments reinforced plastic capable of withstanding the internal pressure loading surrounded by a thick mass of a core material capable of withstanding the compressive load and "D" loads such as concrete, for example, over which is wrapped a thin layer of reinforced plastic. When such cylindrical structures are subject to external loads, however, the deformation of the circular cross section is resisted by shear loads at the interfaces between the core material and reinforced plastic and failure of the structure occurs at the bond between these materials.

According to this invention, however, an inexpensive composite reinforced plastic pipe is provided that is capable of withstanding substantial external pressure loads and "D" loads without failure.

It is, therefore, an object of this invention to provide a composite reinforced plastic pipe capable of withstanding both internal and external pressure loads.

It is another object of this invention to provide a large diameter composite reinforced plastic pipe capable of withstanding internal and external pressure loads.

It is another object of this invention to provide a method for fabricating composite reinforced plastic pipe.

Figure 2:
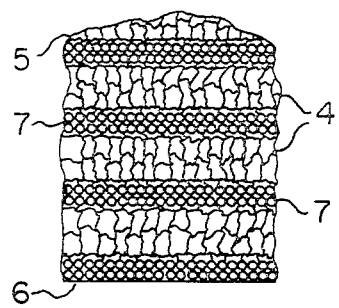
Figure 3:
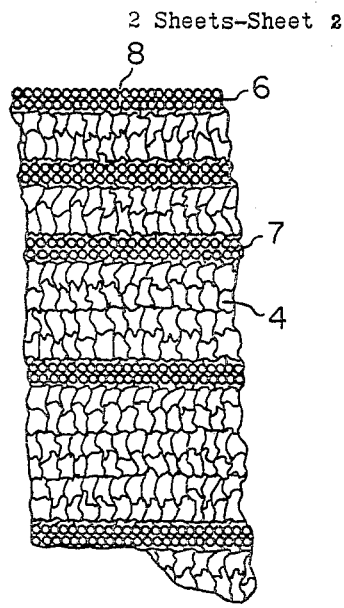
Figure 4:
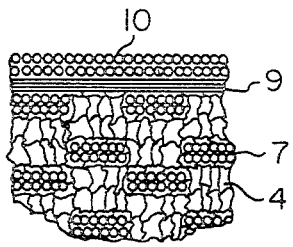
Figure 5:
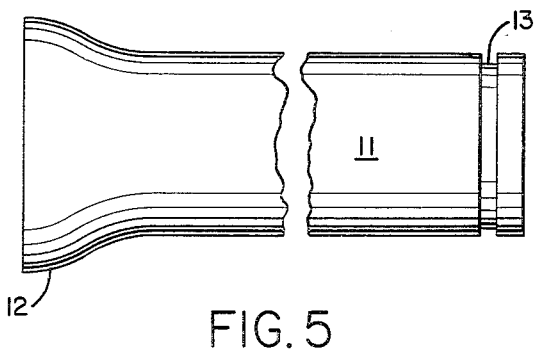

These and other objects of this invention will be readily apparent from the following description with reference to the accompanying drawings wherein:

FIGURE 1 is a schematic representation of the formation of the composite reinforced pipe according to this invention, FIGURES 2, 3, and 4 are enlarged views of sections through the various embodiments of composite pipe according to this invention, and FIGURE 5 is a foreshortened side view of a pipe according to this invention.

DESCRIPTION OF THE INVENTION

Broadly stated, this invention contemplates a composite reinforced platsic pipe comprised of a plurality of layers of continuous high strength filamentary material, successive layers each being separated by a layer of a particulate material, the entire structure being bonded together by a cured resinous binder. The relative thickness of the filamentary layer and the particulate layer should be carefully adjusted since too thin a particulate layer will require excessive amounts of fiber glass in the finished pipe and too thick a layer will create internal shear stresses which will cause cracks at the interfaces between the filaments and the particles upon deformation of the pipe. It has been found that the ratio of thickness of the particulate layer to the filamentary layer, $T_p/T_f$, should be within the range of from 2–50 and preferably at about 6.

It should be noted that the ratio of the $T_p/T_f$ need not be constant across the wall of the pipe. Since the shear stresses are not uniformly distributed across the wall, it is possible to maximize the properties of the pipe by employing low $T_p/T_f$ values in the regions of stress concentration and higher values of $T_p/T_f$ in low stress areas.

For example, the shear stresses produced by the "D" loads concentrate within the wall adjacent to the internal and external surfaces thereof. The $T_p/T_f$ value in these regions can be selected in the lower portion of the range whereas in the central portion of the wall where there is little shear stress, the $T_p/T_f$ value can be selected in the upper portion of the range.

Preferably the pipe would be designed such that the structure, after curing of the resinous binder, contains sufficient filamentary material to withstand the internal pressure loads and sufficient particulate material between the filamentary layers to withstand the compressive and "D" loads. However, due to the above limitations on the relative thicknesses of the respective layers, in some applications when extremely high external loading pressures are encountered, it may be necessary to incorporate amounts of filamentary material in excess of that required to withstand the internal pressures.

Due to its high strength, chemical and physical properties and commercial availability, glass is the preferred filamentary material. However, other high strength filaments such as metallic wires or filaments and other materials such as filamentary silica could be employed. The filaments may be in the form of continuous filaments or as a fiber formed of braided filaments.

The preferred particulate material is sand. However, many other materials may be used such as particulate silica, small hollow spheres of various materials and carbon and graphite. If, for example, a light weight conduit is desired, vermiculite or small hollow spheres of various materials such as glass or phenolic resin would be preferred materials.

Any of the polymeric binder systems used in the preparation of reinforced plastic structures may be used in this invention, epoxy and polyester systems being particularly desirable.

Referring now to FIGURE 1, a schematic representation of a system for fabricating pipe according to this invention is shown. Since the apparatus forms no part of this invention, only the elements necessary for an understanding of this invention are shown, a complete description of a suitable machine appearing in U.S. Patent No. 3,228,616.

A mandrel adapted for rotation, as shown by the arrow, has a band of glass filaments 2 wet with resin applied thereto. In an alternative embodiment, the resin could be applied to the band 2 after it is on the mandrel by a suitable application such as brushing or spraying, as is well known in the art. Regardless of the specific means for applying the resin, sufficient resin should be present to cause the amount of particulate material which is subsequently added to be held on the surface of the band until it is covered by a subsequent layer of filaments. The filaments are fed onto mandrel 1 from a movable carriage not shown which continually moves back and forth from one end of the mandrel to the other as the mandrel rotates to produce layers of continuous annularly disposed filaments. The winding angle which is exaggerated for clarity in FIGURE 1, can be selected to meet specific requirements by workers in the art, preferably, however, the annularly disposed filaments are wound in a very high angle helix which produces essentially a hoop winding. A hopper 3 travels with the movable carriage and distributes the particulate material 4 onto the filaments 2, the particles being held in place by the resin with which filaments 2 are wetted. The broken away section of FIGURE 1 illustrates the buildup of successive alternate layers of particles 4 and filament bands 2. The winding procedure is continued until the desired wall thickness is obtained. The outer layer may be either filamentary or particulate as desired. An outer particulate surface will, of course, produce a rougher finished surface, and may facilitate handling during the pipe laying operation. The entire structure is then cured and the mandrel is removed. Although it is preferable to remove the mandrel, a hollow mandrel could be employed and allowed to remain as the inner wall of the pipe. The end portion of the cylinder which may be irregular due to the end pattern formed by the reversal of the direction of the movable carriage can be cut off and the pipe is ready for use or the structure may be formed against flat stops, eliminating the final trim. Joint structures can be machined on the ends of the pipe if desired or a desired end configuration can be wound into the end portion if desired. Thus as shown in FIGURE 5, a pipe 11 according to this invention may be provided with a joint such as, for example, the conventional male and female fittings comprising a female bell housing 12 wound into one end of the pipe and a male spigot fitting having an O-ring groove 13 machined into the other end of the pipe. Such joint structures are known to the art and the joint structure per se does not constitute part of this invention.

FIGURE 2 is a magnified view of a longitudinal section through a pipe wall, illustrating in greater detail the internal structure of the pipe. The internal wall 6 of the pipe 5 is shown as being a layer of glass filaments surrounded by successive layers of particles 4 and filaments 7, the entire structure being held together by the cured resinous binder. It is noted that each filament layer 7 consists of two layers of filaments which resulted from band 2 being two filaments thick. In practice, it has been found that glass filament bands from 5 to 6 monofilament diameters thick are easiest to handle and, accordingly, it is contemplated in this invention that the filament layers can be either one filament thick or many filaments thick.

FIGURE 3 is a cross sectional view of another embodiment of this invention in which the $T_p/T_f$ ratio varies across the wall structure. In this embodiment the shear stress is concentrated near the surface 8, and, accordingly, the thickness of the particle layers in this region is smaller than in regions closer to the center of the wall.

In another embodiment shown in FIGURE 4, the horizontal layers are nonuniform with bands of filaments 7 being separated by particulate material 4. Such a structure can be employed to reduce the likelihood of separation at the laminar interfaces between continuous layers of filaments and particles. The structure of FIGURE 4 could be produced, for example, by applying the particles to the filament band prior to winding on the mandrel and then winding the particle coated band in an open pattern which requires two or more passes of the filament band to cover the entire winding surface.

In certain cases, it may be desirable to incorporate longitudinally disposed filaments into the wall structure to impart a resistance to bending moments. This invention contemplates the incorporation of such filaments in addition to the annularly disposed filaments or in the alternative resistance to bending can be provided by using a lower winding angle. If longitudinal filaments are incorporated, they are preferably laid, under tension, on the outer surface of the pipe and held in place by an additional layer of hoop windings as illustrated by longitudinal filaments 9 and hoop filaments 10 in FIGURE 4.

It is also contemplated that various other materials including, for example, non-permeable membranes such as polyamide films, polyester films such as those of polyesters of terephthalic acid and ethylene glycol sold under the trademark Mylar, films of polymers and copolymers of vinylidene chloride such as those sold under the trademark Saran, or rubber sheets can be applied on the inner and outer surfaces of the pipe or within the wall structure without departing from the scope of the invention.

EXAMPLE

A composite reinforced plastic pipe I.D. 24″, O.D. 25½″ was fabricated according to this invention. Each glass filament layer was approximately .005″ thick and composed of 18,360 individual mono-filaments per cross-sectional inch, each filament being approximately .00051″ in diameter. The particles used were sand particles having a mean size of about .03″ and each particle layer was about .046″ thick. The entire structure was bonded together by polyester resin which accounted for about 25% of the total weight. The finished pipe was capable of withstanding an internal pressure of 938 p.s.i. and an external "D" load of 3,690 lbs.

The instant pipe is capable of withstanding external "D" loads about 1000% higher than a sandwich structure pipe fabricated from a concrete body sandwiched between inner and outer filament skins containing the same amount of fiber glass.

I claim:
1. A composite reinforced plastic pipe capable of withstanding internal and external pressure loads comprising:
  (a) a plurality of annular layers of high strength filamentary material individual layers consisting of a multiplicity of turns of a band of continuous high strength filamentary material extending around the axis of the pipe along the length thereof;
  (b) a plurality of layers of particulate material sandwiched between the annular layers of high strength filamentary material, individual particles of the particulate material being substantially incompressible, the volume of particulate material in each layer being sufficient to provide particle-to-particle contact substantially throughout each layer and particle to filamentary material contact at both interfaces of each particulate material layer with its adjacent filamentary material layers, whereby said particles will provide the compressive load bearing path between adjacent filamentary material layers, the ratio of the thickness of each particulate material layer to an adjacent filamentary material layer being in the range of from 2 to 50; and (c) a cured polymeric matrix binding each filament of filamentary material to each adjacent filament and binding each particle of the particulate material to each adjacent particle and to each adjacent filament of filamentary material.

2. The pipe of claim 1 wherein the ratio of the thickness of said particulate material layers to said filamentary material layers varies across the cross-section of the pipe with the ratio being smaller in proximity to the inner and outer surfaces of said pipe and larger in the intermediate portion of said pipe.

3. The pipe of claim 2 wherein said high strength filamentary material is glass.

4. A hollow composite reinforced plastic member capable of withstanding internal and external pressure loads and bending loads comprising a unitary annular wall structure defining a central axially extending opening, said wall structure comprising a cured polymeric matrix having bonded therein:

(a) a plurality of successive layers of continuous annularly disposed high strength filamentary material separated from each other by a plurality of successive layers of particulate material, the ratio of the thickness of the layers of particulate material to an adjacent filamentary material layer being in the range of from 2 to 50, each said layer of high strength filamentary material consisting essentially of a multiplicity of turns of a continuous filamentary band, said turns extending around the axis of said member along the length thereof, said continuous filamentary band consisting essentially of a multiplicity of continuous high strength filaments coextensive with the length of sand band, and (b) a layer of longitudinally disposed high strength filaments discrete from said layers of annularly disposed high strength filamentary material, said layer of longitudinally disposed filaments extending around the axis of said member substantially for the length thereof.

5. The composite reinforced plastic member of claim 4 wherein said layers of annularly disposed high strength filamentary material are substantially contiguous along the length thereof.

6. The composite reinforced plastic member of claim 4 wherein said layers of annularly disposed high strength filamentary material are substantially non-contiguous along the length thereof.

7. The member of claim 4 further comprising pipe joint means at the ends thereof whereby said member may be joined to other of said members.

8. The member of claim 7 wherein said filamentary material is glass.

9. The pipe of claim 8 wherein said particulate material is sand.

10. The member of claim 4 wherein said filamentary material in glass.

11. The pipe of claim 10 wherein said particulate material is sand.

12. A hollow composite reinforced plastic member capable of withstanding internal and external pressure loads and bending loads comprising a unitary annular wall structure defining a central axially extending opening, said wall structure comprising a cured polymeric matrix having bonded therein:

(a) a plurality of successive layers of continuous annularly disposed high strength filamentary material separated from each other by a plurality of successive layers of particulate material, the ratio of the thickness of said particulate material layers to adjacent annularly disposed filamentary material layers varying across the wall structure with the ratio being smaller in proximity to the inner and outer surfaces of the said wall structure and layers in the intermediate section of said wall structure, each said layer of high strength filamentary material consisting essentially of a multiplicity of turns of a continuous filamentary band, said turns extending around the axis of said member along the length thereof, said continuous filamentary band consisting essentially of a multiplicity of continuous high strength filaments coextensive with the length of said band, and (b) a layer of longitudinally disposed high strength filaments discrete from said layers of annularly disposed high strength filamentary material, said layer of longitudinally disposed filaments extending around the axis of said member substantially for the length thereof.

13. The member of claim 12 wherein the ratio of the thickness of the particle layers to an adjacent annular filamentary material layer is in the range of from 2 to 50.

14. The member of claim 13 further comprising pipe joint means at the ends thereof whereby said member may be joined to other of said members.

15. The member of claim 14 wherein said filamentary material is glass.

16. The member of claim 12 further comprising pipe joint means at the ends thereof whereby said member may be joined to other of said members.

17. The member of claim 16 wherein said filamentary material is glass.

18. The member of claim 12 wherein said filamentary material is glass.

19. The pipe of claim 18 wherein said particulate material is sand.

20. A composite reinforced plastic pipe capable of withstanding internal and external pressure loads comprising:

(a) a plurality of annular layers of high strength filamentary material, individual layers consisting of a multiplicity of turns of a band of continuous high strength filamentary material extending around the axis of the pipe along the length thereof;

(b) a plurality of layers of particulate material sandwiched between the annular layers of high strength filamentary material, individual particles of the particulate material being substantially incompressible, the volume of particulate material in each layer being sufficient to establish particle-to-particle contact substantially throughout each layer and particle to filamentary material contact at both interfaces of each particulate material layer with its adjacent filamentary material layers, whereby said particles will provide the compressive load bearing path between adjacent filamentary material layers;

(c) a discrete layer of longitudinally disposed high tensile strength filamentary material extending around the axis of said pipe along the length thereof; and (d) a cured polymeric matrix binding each filament of filamentary material to each adjacent filament and binding each particle of the particulate material to each adjacent particle and to each adjacent filament of filamentary material.

21. The pipe of claim 20 wherein the ratio of the thickness of each layer of particulate material to an adjacent layer of annular filamentary material is in the range of from 2 to 50.

22. The pipe of claim 21 wherein said high strength filamentary material is glass.

23. The pipe of claim 22 wherein said particulate material is sand.

24. The pipe of claim 21 wherein said particulate material is sand.

25. The pipe of claim 21 further comprising pipe joint means at the ends thereof whereby said pipe may be connected to other of said pipes.

26. The pipe of claim 20 wherein said high strength filamentary material is glass.

27. The pipe of claim 26 wherein said particulate material is sand.

28. The pipe of claim 20 wherein said particulate material is sand.

29. The pipe of claim 20 wherein the ratio of the thickness of said particulate material layers of said filamentary material layers varies across the cross-section of the pipe with the ratio being smaller in proximity to the inner and outer surfaces of said pipe and larger in the intermediate portion of said pipe.

References Cited

UNITED STATES PATENTS

| | | | |
|---|---|---|---|
| 2,742,931 | 4/1956 | Ganahl | 138—144 |
| 1,504,805 | 8/1924 | Borsodi | 138—141 |

FOREIGN PATENTS 612,274 11/1948 Great Britain.

LAVERNE D. GEIGER, Primary Examiner

EDWARD J. EARLS, Assistant Examiner

U.S. Cl. X.R.

138—144, 153

UNITED STATES PATENT OFFICE
CERTIFICATE OF CORRECTION

Patent No. 3,483,896                    Dated December 16, 1969

Inventor(s) James L. Grosh

It is certified that error appears in the above-identified patent and that said Letters Patent are hereby corrected as shown below:

Column 4, line 64, "material individual" should read ---material, individual---. Column 5, line 40, "sand" should read ---said---. Column 5, lines 60 and 64, and Column 6, line 36, "pipe" should read ---member---. Column 6, line 5, "layers" should read ---larger---. Column 7, line 11, "layers of said" should read ---layers to said---.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents